July 31, 1956 H. J. MURPHY 2,756,796
PANEL FASTENER COMPRISING A BOLT, SOCKET THEREFOR
AND CO-OPERATING DETENT LOCKING MEANS
BETWEEN SAID BOLT AND SOCKET
Filed June 7, 1952
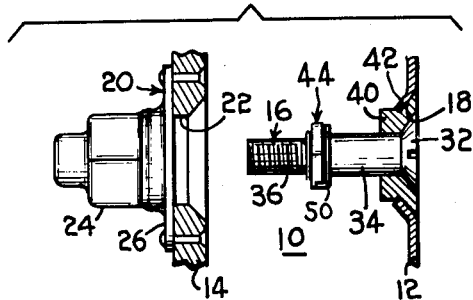
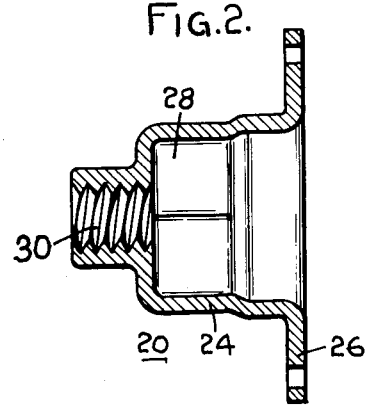
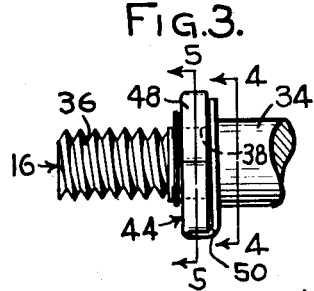
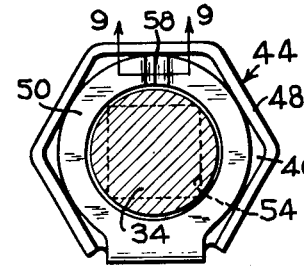
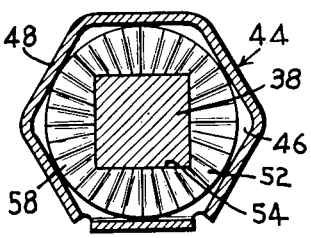
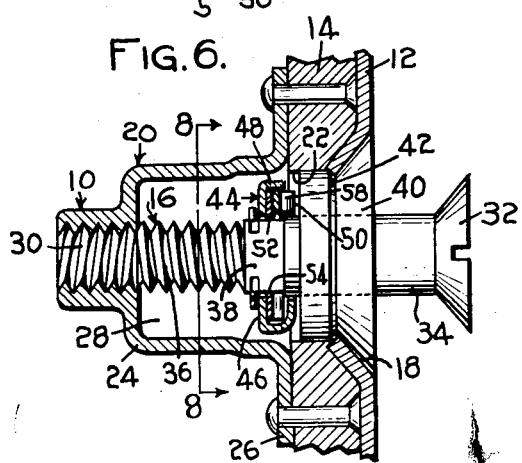
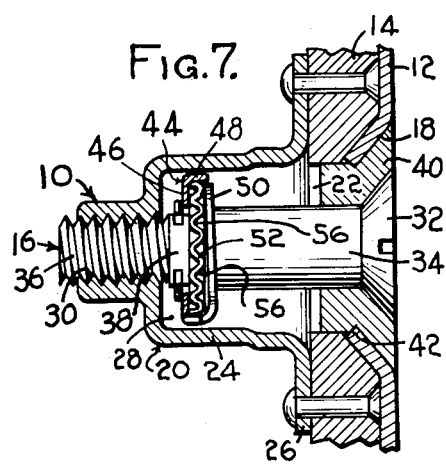
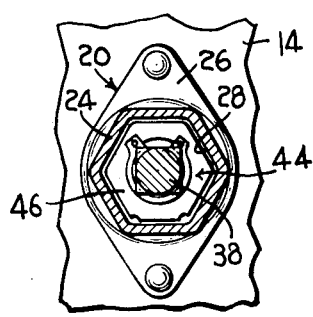
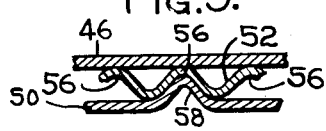
INVENTOR:
HOWARD J. MURPHY,
BY Robert E Ross
AGENT.

United States Patent Office 2,756,796
Patented July 31, 1956

2,756,796

PANEL FASTENER COMPRISING A BOLT, SOCKET THEREFOR AND CO-OPERATING DETENT LOCKING MEANS BETWEEN SAID BOLT AND SOCKET

Howard J. Murphy, Lynnfield, Mass., assignor, by mesne assignments, to United-Carr Fastener Corporation, Boston, Mass., a corporation of Delaware Application June 7, 1952, Serial No. 292,254

3 Claims. (Cl. 151—41.5)

This invention relates generally to fastening devices, and has particular reference to a high strength panel fastener for securing superimposed panels of aircraft or the like.

In the construction of aircraft for travel at extremely high speeds, it has been found desirable to design the airframe so that the outer sheet metal covering provides part of the structural strength thereof. Such sheet metal covering must necessarily be provided with panels to allow access to apparatus inside the airframe, and such panels must be capable of being rapidly removed and replaced. However, since the panels, when in place, provide a portion of the structural strength of the airframe, the fastening means used must be exceedingly strong and reliable. This is particularly true in the case of aircraft designed to operate at speed approaching or exceeding the speed of sound, since at such speeds considerable shear stress may be produced between the panel and the main body of the airframe. In such aircraft, the airframe covering is formed of relatively thick metal, resulting in an exceedingly stiff structure. Consequently, a fastener for attaching such panels must have sufficient strength to pull the stiff panels tightly together, and must be designed to have a relatively large amount of tolerance to enable it to pull slightly misformed panels into place, and to accommodate panels having variations in thickness; and it is the object of this invention to provide an improved fastener which satisfies these requirements.

In the drawing:

Fig. 1 is a view in elevation of the stud and socket embodying the features of the invention;

Fig. 2 is an enlarged view in section of the socket member of Fig. 1;

Fig. 3 is an enlarged view in elevation of the stud member of Fig. 1;

Fig. 4 is a view in section taken on line 4—4 of Fig. 3;

Fig. 5 is a view in section taken on line 5—5 of Fig. 3;

Fig. 6 is a view in elevation, partly in section, of the stud and socket in position for assembly;

Fig. 7 is a view similar to Fig. 6 in which the stud and socket are completely assembled;

Fig. 8 is a view in section taken on line 8—8 of Fig. 7; and

Fig. 9 is a view in section taken on line 9—9 of Fig. 4.

Referring to the drawing, there is illustrated a fastening device 10, which is adapted for joining superimposed panels 12 and 14, and comprises a stud 16 for assembly into an opening 18 in the panel 12, and a socket 20 for assembly onto the panel 14 opposite an opening 22 therein.

The socket 20 comprises generally a hollow body 24 having a mounting flange 26 at one end, an internal cavity 28 which opens to the end having the flange 26. The cavity 28 is generally polygonal in cross section, and in the illustrated embodiment is generally hexagonal, for a purpose to appear hereinafter. The end of the body opposite the flanged end is provided with a threaded opening 30 which opens into the cavity 28.

The stud 16 comprises a head 32 and a shank 34 having a threaded end portion 36, and a squared portion 38 disposed adjacent the threaded portion. In some cases, a bushing 40 is provided on the shank, which has a peripheral recess 42 so that the bushing may be permanently assembled into the panel opening 12, with the edges of the panel about the opening seated in the recess. The shank 34 is rotatable in the bushing, and preferably is also movable longitudinally therein.

To provide a friction lock feature to the device, a rotatable member 44 is assembled onto the shank above the threaded portion, and comprises a base 46 having a hexagonal periphery with an upstanding peripheral wall 48, and a retaining member 50 joined to the wall 48 at one side thereof and extending over the base 46 in spaced relation thereto. A non-rotatable member 52, having a square central opening 54 is assembled onto the squared portion 38 of the shank, and has a sinuous peripheral portion forming a circumferential series of recesses 56. The retaining member 50 is provided with an embossed detent 58 on the side opposite the junction with the peripheral wall, and the retaining member is formed of spring material, so that the detent 58 snaps from one recess to another about the non-rotatable member during assembly of the stud in the socket as will be described hereinafter, to impart a friction lock action thereto.

The assembly of the stud and socket is accomplished by superimposing the panels and inserting the end of the stud into the socket so that rotation of the stud causes the threaded end thereof to advance into threaded engagement in the threaded opening 30 of the socket. As the stud advances into the socket, the non-rotatable and rotatable members are carried into the cavity 28. As the polygonal periphery of the member 44 enters the polygonal cavity, the member 44 ceases to rotate with the bolt, and becomes non-rotatable in the socket. However, since the member 44 is rotatable in relation to the stud, and the member 52 is non-rotatable in relation to the stud, further rotation of the stud causes the member 52 to rotate with the stud in relation to the member 44, thereby creating a friction lock action as the detent snaps into and out of the recesses 56. The continued rotation of the stud draws the panels 12 and 14 tightly together, and thereafter the detent remains seated in one of the recesses and prevents loosening of the stud in the socket by vibration applied to the panels.

Disassembly of the device is accomplished by simply turning the stud in the opposite direction until the threaded end becomes disengaged from the threaded opening 30.

The depth of the cavity 28, in addition to providing room to receive the members 44 and 52, also spaces the threaded opening a predetermined distance from the plate 14 so that the plate 12 can be superimposed thereon before the threaded end of the stud has engaged the socket.

It will be understood that the hexagonal shape of the socket and the rotatable member is exemplary only, since many other shapes may be used with equally good results, it only being necessary that the rotatable member be non-rotatable in the socket. The terms rotatable and non-rotatable as used hereafter in the claims refer to the relation of the members to the stud on which they are mounted.

Since other obvious modifications may be made in the device without departing from the scope of the invention, it is intended that all matter contained herein be interpreted in an illustrative and not in a limiting sense.

I claim:

1. A panel fastener, comprising a stud for assembly into an opening in one panel and a socket for mounting onto another panel opposite an opening therein, said stud comprising a head and a shank having a threaded end portion and a friction lock member assembled onto the shank between the threaded portion and the head, said socket comprising a hollow body having an inner cavity extending to one end thereof and a threaded opening at the other end to receive the threaded end of the stud, said friction lock member comprising a first portion which is rotatable in relation to the stud and having a base and an integral retaining member disposed over the base, and a second portion disposed between the base and the retaining member, said second portion being non-rotatable in relation to the stud, said first and second portions having interengaging detent means, said first portion and said hollow body of the stud having corresponding configurations such that said first portion is non-rotatable in the cavity and longitudinally movable therein.

2. A panel fastener comprising a stud for assembly into an opening in one panel and a socket having a laterally extending flange for mounting onto another panel to dispose the socket opposite an opening therein, said stud comprising a head and a shank having a threaded portion, a rotatable member having a polygonal outer periphery mounted on the shank above the threaded portion, and a non-rotatable member mounted on said shank in frictional engagement with said rotatable member, said rotatable member having a base and an integral retaining member disposed over the base, said non-rotatable member being disposed between the base and the retaining member, and said members having interengaging detent means to increase the resistance to relative rotation of the members, said socket comprising a hollow body having an inner cavity extending to one end thereof, said cavity being generally polygonal in cross-section to conform to the shape of the periphery of the rotatable member on the shank whereby said member is non-rotatable in relation to the body during assembly of the stud into the cavity yet movable longitudinally therein, and a threaded opening disposed in the other end of the body to receive the threaded portion of the shank.

3. A panel fastener, comprising a rotatable stud for assembly into an opening in one panel, and a socket having a laterally extending flange for assembly onto another panel to dispose the socket opposite an opening therein, said stud comprising a head and a shank having a threaded end portion, a friction lock member retained on the shank, above the threaded portion and comprising a rotatable member having a polygonal base with an upstanding peripheral wall and an integral retaining member disposed over the side of the base having the wall, and a non-rotatable member disposed on the shank between the base and the retaining member and within the peripheral wall, said non-rotatable member having a circumferential series of recesses, and said retaining member having detent means engaging said non-rotatable member so as to snap into and out of the recesses during relative rotation of the members, said socket comprising a hollow body having an internal cavity opening to one end to receive the stud and the rotatable and non-rotatable members, said cavity being generally polygonal in cross section to conform to the shape of the rotatable member on the stud, so that said member is non-rotatable in the cavity yet movable longitudinally therein, and a threaded opening in the other end of the body to receive the threaded end of the stud, whereby rotation of the stud to tighten it in said threaded opening causes relative rotation between the members on the stud so that said detent means and said recesses cause a friction lock to be developed therebetween, and said friction lock member moves longitudinally in the housing with the stud.

References Cited in the file of this patent

UNITED STATES PATENTS

| | | |
|---|---|---|
| 721,990 | Young | Mar. 3, 1903 |
| 1,027,508 | Schweinert | May 28, 1912 |
| 1,115,864 | Raymond | Nov. 3, 1914 |
| 1,246,353 | Thigpen | Nov. 13, 1917 |
| 1,646,805 | Bell | Oct. 25, 1927 |
| 2,420,733 | Cannova | May 20, 1947 |